United States Patent

[11] 3,582,785

[72] Inventor Wilmber B. Gaunt, Jr.
Boxford, Mass.

[21] Appl. No. 857,425
[22] Filed Sept. 12, 1969
[45] Patented June 1, 1971
[73] Assignee Bell Telephone Laboratories, Incorporated
Murray Hill, N.J.

[54] HYBRIDLESS DELTA MODULATION SIGNAL TRANSFER CIRCUIT
4 Claims, 2 Drawing Figs.

[52] U.S. Cl. .................................................. 325/38R, 325/38A, 325/38B, 325/52, 325/55, 325/63, 325/64, 325/65, 179/15AE, 343/176
[51] Int. Cl. .................................................. H04b 1/00
[50] Field of Search .................................................. 179/2.5, 15 AD, 15 AE, 170 F, 170 NC; 325/52, 55, 63, 64, 65, 38, 38 A, 38 B; 343/175, 177, 178, 179, 180

[56] References Cited

UNITED STATES PATENTS 2,907,874 10/1959 Halvorson .................... 179/170

*Primary Examiner*—Robert L. Griffin
*Assistant Examiner*—Albert J. Mayer
*Attorneys*—R. J. Guenther and James Warren Falk

ABSTRACT: A signal transfer system using delta modulation to exchange signals between a plurality of stations is described in which a hybridless bilateral circuit is connected between each station and a common transmission path. The bilateral circuit includes a delta modulation coder comprising a pair of cascaded delay circuits and integrating network demodulators connected in a negative feedback arrangement. The negative feedback arrangement connected between a pair of selected bilateral circuits operates to exchange signals by minimizing the signal differences between the stations.

INVENTOR
W. B. GAUNT, JR.
BY
ATTORNEY

PATENTED JUN 1 1971 3,582,785

HYBRIDLESS DELTA MODULATION SIGNAL TRANSFER CIRCUIT

BACKGROUND OF THE INVENTION

My invention is related to transmission arrangements and, more particularly, to hybridless bilateral transmission arrangements for communication and similar systems in which delta modulation techniques are used.

In communication systems, it is common practice to transfer signals between interconnected stations via modulated waves comprising carrier signals modified by information signals from each of the interconnected stations. This is done in accordance with the particular modulation scheme employed. The modulation scheme may involve a pulse modulation scheme such as delta modulation. When delta modulation is employed, the transmission circuitry associated with each station comprises a delta modulator, a demodulator such as an integrator, elements for coupling outgoing signals from the modulator to the transmission medium, and elements for coupling incoming signals from the transmission medium to the demodulator.

Connections between the station and the modulator and demodulator must include circuit arrangements that operate to prevent regenerative coupling between the demodulated incoming signals from a connected station and the outgoing signal being applied to the modulator. If this demodulated incoming signal is permitted to appear at the modulator input, regenerative interference may result which can substantially block transmission of signals between stations. In some systems, completely separate incoming and outgoing paths are provided so that interference is avoided. In other systems, a separate circuit is included to isolate the incoming and outgoing signals at each station. This is especially desirable where there are only two-wire connections between the stations. In some priorly known systems, hybrid arrangements or time separation schemes have been devised for this purpose but the devices and circuits used for this purpose add to the complexity and cost of the transmission circuitry.

The transmission circuitry connected between a station and the transmission medium should provide an impedance match with the impedance of the station at the junction between the transmission circuitry and the station so that signal reflections in the transmission path are avoided. In the hereinbefore-mentioned hybrid arrangements, an impedance match is difficult to obtain. Any mismatch in these hybrids, however, introduces a loss which detracts from the efficiency of transmission. Where pulse modulation is employed, mismatch causes unwanted reflections that may substantially interfere with signal transmission.

A signal transfer system, in which hybridless bilateral transmission circuits couple delta modulated information signals between stations interconnected through a common transmission network, is disclosed in my copending application, Ser. No. 678,398, filed Oct. 26, 1967 now U.S. Pat. No. 3,540,049. The arrangement therein disclosed employs negative feedback connections operative to exchange signals between stations by minimizing the difference between the signals from the connected stations. The arrangement may also include circuitry that alters the magnitude of the signal received by each station and matches the impedance of each bilateral transmission circuit to its connected station.

In prior delta modulator circuits used in the foregoing system, a nonlinear two-state amplifier provides a bilevel output in response to the difference between the demodulated signals from the two stations. The nonlinear characteristics of the amplifier, however, can cause distortion in the resulting delta modulated output, which distortion degrades the quality of signals and interferes with signal exchange.

BRIEF SUMMARY OF THE INVENTION

My invention is concerned with the transmission of delta modulated signals between stations via hybridless bilateral circuits which are utilized to exchange signals between selected stations. Each bilateral circuit is connected between a station and a common interconnection network. The bilateral circuit operates to delta modulate an outgoing signal from the station and to couple the delta modulated outgoing signal to the network. A feedback path is included in the bilateral circuit wherein a signal responsive to the demodulated difference between the outgoing delta modulated signal and any signal incoming from the network is applied to the junction of the bilateral circuit with the associated station. The portion of the fed back signal derived from the outgoing delta modulated signal is subtracted from the outgoing signal at the junction and the portion of the fed back signal derived from the incoming signal originating at another station is coupled to the connected station.

My invention is a delta modulated coder in each of said bilateral circuits which operates in a digital manner. The coder employs a first circuit to produce pulses triggered by repetitive delta modulating pulses. The first circuit output pulses have durations which vary in accordance with the above-mentioned difference signal. The trailing edges of the first circuit output pulses trigger a second circuit that generates fixed duration pulses which, in turn, gate the repetitive modulating pulses to the transmission path and to the feedback path.

DETAILED DESCRIPTION

Figure 1:
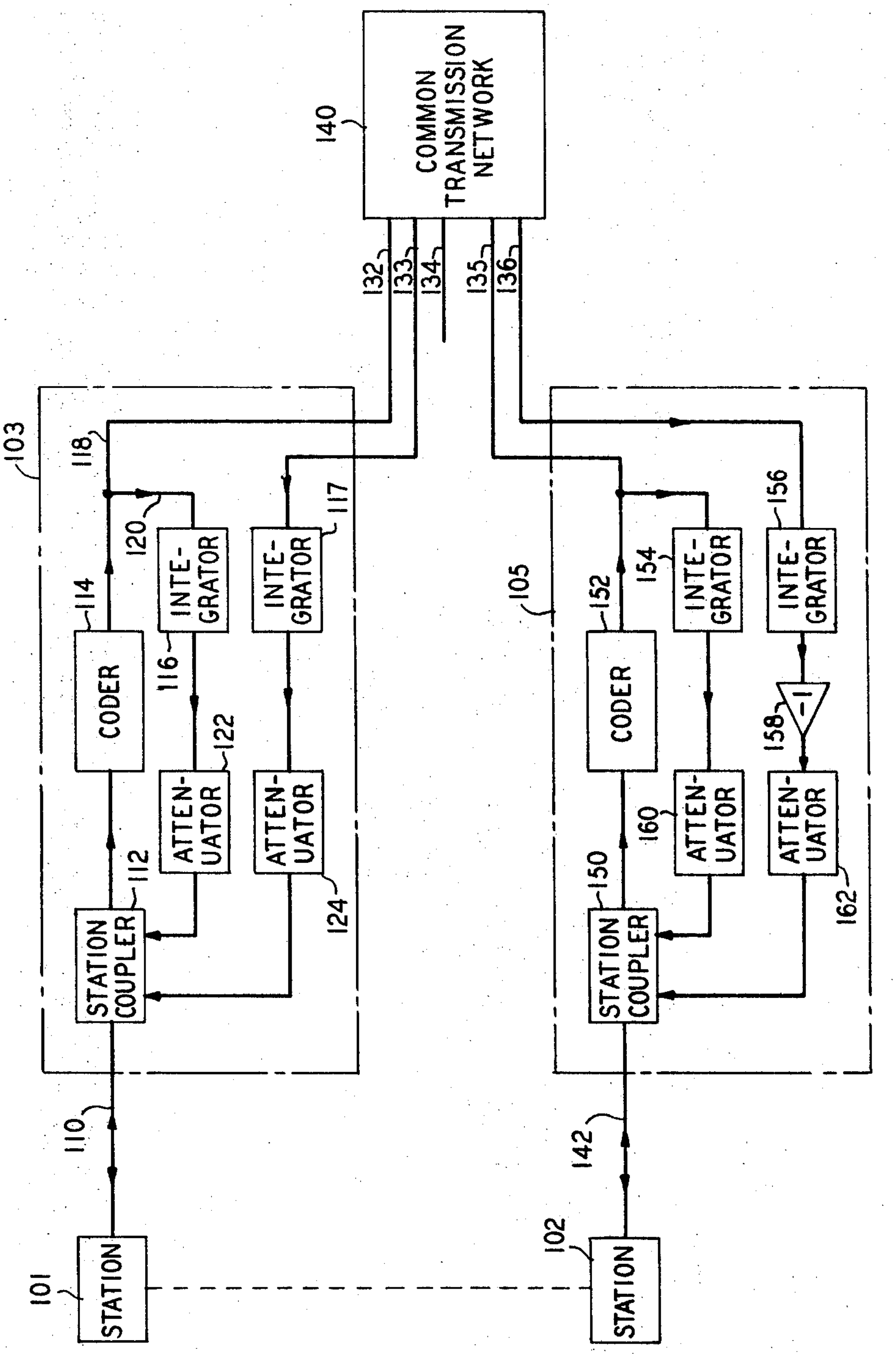
FIG. 1 depicts a general block diagram of a prior hybridless signal transfer arrangement utilizing delta modulation.

FIG. 1 shows the hybridless signal transfer system arrangement disclosed in my copending application, Ser. No. 678,398, filed Oct. 26, 1967, wherein delta modulation signals are exchanged between bilateral transmission circuits 103 and 105 via common transmission network 140. Signals from station 101 are applied to station coupler 112 via line 110. Station coupler 112 operates to combine the signals from station 101 with the signals from the feedback paths including integrators 116 and 117. The output of station coupler 112 is transmitted to delta modulation coder 114 from which a delta modulated code is obtained. This delta modulated code corresponding to the combined signals from station 101 and the feedback paths connected to station coupler 112 is transmitted via line 132, network 140, and line 136 to bilateral circuit 105.

In bilateral circuit 105, the received delta modulated code is detected in integrator 156 and the detected output therefrom is coupled to station coupler 150 via amplifier 158 and attenuator 162. A signal corresponding to the signal from station 101 is applied from coupler 150 to station 102 via line 142. The output of station coupler 150 is applied to coder 152, and the delta modulated code therefrom corresponding to the linearly combined inputs of station coupler 150 is returned to bilateral circuit 103 via line 135, transmission network 140, and line 133. The return signal is decoded in integrator 117 and coupled to station coupler 112. The decoded return signal in station coupler 112 operates as a negative feedback signal. In the absence of signals from station 102, the portion of the return signal corresponding to the originating signal from station 101 appropriately cancels the outgoing signal from station 101 so that none of the originating signal from station 101 is returned to its source. In this way, hybridless signal transmission is accomplished.

A portion of the delta modulated output from coder 114 is also fed back to station coupler 112 to provide the necessary information for proper delta modulation, as is well known in the art. Station coupler 112 receives signals from two feedback paths as well as the signal from station 101. Signals transmitted from station 102 are received by station 101 via the path including station coupler 112 and integrator 117. In this way signal transmission is completed from station 102 to station 101. As described with respect to bilateral circuit 103, the overall negative feedback path prevents the return of signals originating in station 102 to that station. Amplifier 158 provides a signal inversion so that the overall feedback between the bilateral circuits is negative.

Figure 2:
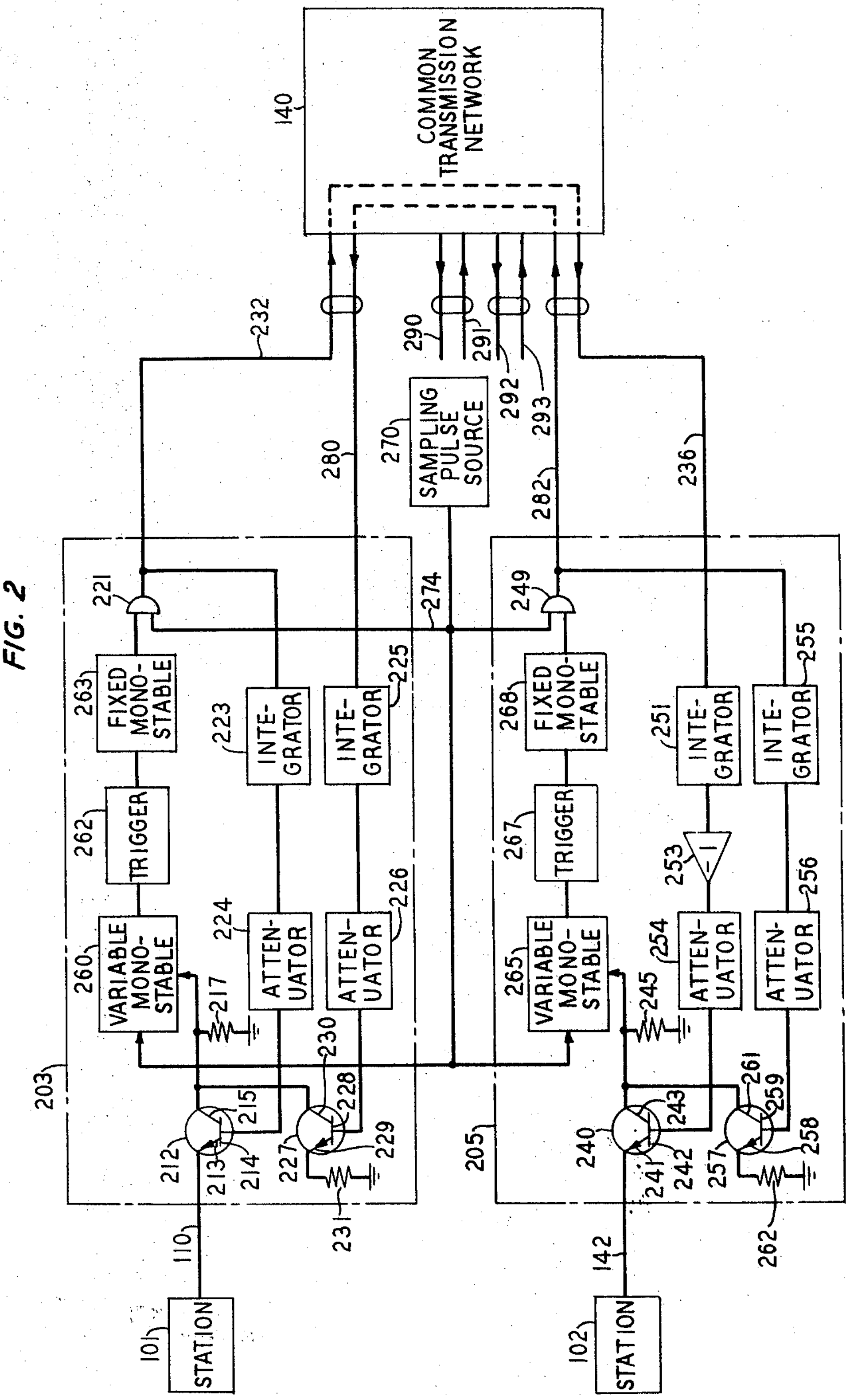
FIG. 2 depicts an illustrative embodiment of the invention.

FIG. 2 shows a hybridless delta modulated signal transfer system in accordance with my invention wherein a digital-type coder is employed to improve the hybridless signal transfer system. Station 101 is connected to bilateral transmission circuit 203 and signals from this bilateral circuit are transmitted via line 232, transmission network 140 and line 236 to bilateral transmission circuit 205 and therefrom to station 102. Signals from station 102 are transmitted via circuit 205, line 282, network 40, line 280 and circuit 203 to station 201.

Each bilateral transmission circuit comprises a digital-type delta modulation coder. In bilateral circuit 203, the coder includes transistor 212, variable monostable 260, trigger 262, fixed monostable 263 and gate 221. Variable monostable 260 produces output signals in response to clock pulses from sampling pulse source 270. The duration of each output signal is determined by the signal voltage across resistor 217. This signal voltage is the linear combination of the signal voltage from station 101 via transistor 212, the fed back demodulated signal from the path including gate 221, integrator 223 and attenuator 224 and the demodulated signal from the path including line 280, integrator 225, attenuator 226, and transistor 227. The resultant signal on resistor 217 varies the duration of each output pulse of monostable 260 in a manner well known in the art. This may be done by means of dischargeable storage element whose initial voltage is determined by the resultant signal. In the absence of any signal across resistor 217, the output pulse duration from monostable 260 is relatively constant but the presence of a signal across resistor 217 causes this pulse duration to vary in accordance with the resultant signal voltage derived from transistors 212 and 227.

The trailing edge of the pulse from monostable 260 is detected in trigger 262 which, in turn, applies a narrow trigger pulse at each trailing edge to fixed monostable 263. Monostable 263 then applies a fixed duration signal to gate 221. The fixed duration signal is positioned in accordance with the occurrence of each trailing edge of the pulse from monostable 260. Coincidence between the succeeding clock pulse from source 270 and the fixed monostable output causes gate 221 to open so that an output pulse is obtained therefrom. When there is no coincidence, gate 221 remains closed. In this way, a time position threshold is obtained so that the output of gate 221 is a delta modulated code. This threshold is determined by the time of occurrence of the clock pulses from source 270.

The pulse from gate 221 is demodulated and fed back to the base of transistor 212 via the path including integrator 223. The integrated pulse causes the duration of the next variable monostable pulse to be of decreased duration because the signal voltage across resistor 217 is decreased. As a result of the decreased pulse duration of monostable 260 and the negative feedback, the signal voltage across resistor 217 is increased. This signal voltage increase causes the next variable monostable output pulse to be of increased duration. Thus, in the absence of signals from stations 101 and 102, the pulse duration from monostable 260 varies in such a manner that an alternating pulse pattern is obtained from gate 221, which pattern produces no net integrated signal. The presence of signals at stations 101 or 102 or both provides delta modulated signals because of the variation of the pulse duration from monostable 260 in response to the station signals. Since both bilateral circuits are part of a single negative feedback loop, the signals from sending station 101 are returned to transistor 212 to prevent signal return to station 101; but the received signal originating in the interconnected station 102 is transmitted to station 101 associated with circuit 103.

In accordance with the well-known principles of delta modulators, the sampled output from gate 221 is applied to integrator 223 which may, for example, comprise an RC-type integrator. Alternatively, a combination of flip-flop circuits and integrators may be used. The integrated sample pulses are further applied to base 214 via attenuator 224 and are compared to outgoing signals from station 101 appearing on emitter 213. The difference between the integrated sample signals and the outgoing signal causes a signal to appear at the signal input of variable monostable 260 so that any deviation of the outgoing signal from the integrated voltage at base 214 results in an appropriate pulse output from gate 221. The signal from attenuator 226 is also combined with the difference signal at resistor 217. The modulator arrangements in bilateral circuit 205 are substantially similar to those hereinbefore described except that an additional amplifier 253 is used to reverse the polarities of signals applied to base 242. Inverting amplifier 253 provides negative feedback for signals transmitted between bilateral circuits 203 and 205. Variable monostable 265, trigger 267, fixed monostable 268, sampling gate 249 and integrator 251 operate in the hereinbefore described manner. Other modifications well known in the art may be made to monostable 260 to improve the speed of response of the coding, such as placing two variable monostable circuits in parallel.

The current at the input of variable monostable 260 is very small because of the very high gain of the delta modulation loop. The very high gain is present because a very small deviation in the position of the fixed monostable output pulse about the threshold position can activate gate 221 and cause a large variation in the voltage at the corresponding base 214. Therefore, additional means must be provided to appropriately match the characteristic impedance of station 101. This impedance matching is accomplished through transistor 227 and impedance 231. The current from collector 215 responsive to an outgoing signal from station 101 is conducted through collector 230, the collector-emitter path of transistor 227, emitter 229 and impedance 231 to ground. In like manner, transistor 257 and impedance 262 perform the impedance matching function in bilateral circuit 205.

In order to describe the operation of the delta modulation signal transfer system of FIG. 2, it is assumed that the characteristic impedance of station 101 and line 110 is $z_1$, the characteristic impedance of station 102 and line 142 is $z_2$, and the values of impedances 231 and 262 are $z_3$and $z_4$, respectively. It is further assumed that attenuators 224 and 254 have attenuation factors $n_1$and $n_2$, respectively, and that attenuators 226 and 256 have attenuation factors $m_1$and $m_2$, respectively. Because the transmission system between station 101 and station 102 is substantially symmetrical, it is only necessary to consider transmission of signals in one direction so that it is assumed that outgoing signals are present only at station 101. Unity gain inverting amplifier 253 provides the necessary phase shift in the loop including both bilateral circuits to insure proper feedback. Thus, the signals in the loop in one direction may differ in sign from the signals in the opposite direction. It is to be understood, however, that the transfer system of FIG. 2 may be used to simultaneously exchange signals between stations 101 and 102.

If an outgoing signal voltage $v_{s1}$ is present 1 station 101, a signal voltage $v_1$ appears at emitter 213 because of the voltage drop across characteristic impedance $z_1$. The delta modulation pulse train appearing on line 232 in response thereto is transmitted through network 140 and line 236 to integrator 251 and is also applied to integrator 223. Since the voltage $v_1$is present at emitter 213, substantially the same voltage appears at base 214 and the signal voltage at the output of integrator 223 must be $n_1v_1$. Integrators 223 and 251 in this embodiment are identical and, because the same signal is applied to both, the signal voltage $n_1v_1$also appears at the output of integrator 251. This signal causes a signal voltage $-v_2$ to appear at emitter 241. The signal voltage $-v_2$ is equal to $({}^{\prime}n_{1/}n_2V_1)$ because the signal $n_1v_1$, which determines $-v_2$, passes through attenuator 254 and unity gain inverting amplifier 253. In response to the voltage $v_1$, a voltage $(v_{3/}\ m_1)$ appears at emitter 229. Since variable monostable 260 has a very high input impedance, the current through impedance 231, $(v_{3/}m_{13})$, is equal to the current at collector 215 which is substantially the same as the current, $(v_{s1}-v_1/z_1)$, into emitter 213. In like manner, a voltage $(v_4/m_2)$ appears across impedance 262 so that the current $(v_4/m_2z_4)$ is substantially equal to the current $(v_2/z_2)$ flowing into emitter 241.

The signal voltage at base 228 is, in accordance with well-known transistor principles, substantially equal to the signal voltage at emitter 229, i.e. $v_3/m_1$. Thus, a signal voltage $v_3$ appears at the output of integrator 225. Since integrators 225 and 255 receive identical signals from gate 249, the voltage at the output of integrator 255 is also equal to $v_3$ which voltage $v_3$ produces a signal voltage $v_3/m_2$ at base 259. Thus, $$\frac{v_3}{m_2z_4}=\frac{n_1v_1}{n_2z_2} \quad (1)$$

The current from collector 215 is equal to the current into collector 230, so that $$\frac{v_{s1}-v_1}{z_1}=\frac{m_2z_4n_1v_1}{m_1z_3n_2z_2} \quad (2)$$

Equation (2) can be rearranged to describe the signal voltage $v_1$ at emitter 213 in terms of the outgoing signal voltage $v_{s1}$ from station 1 and the parameters of the signal transfer system as shown in Equation (3)

$$\frac{v_1}{v_{s1}}=\left[\frac{1}{1+\frac{z_4}{z_3}\frac{m_2n_1}{m_1n_2}\frac{z_1}{z_2}}\right] \quad (3)$$

The voltage at station 102 in response to the outgoing signal voltage $v_{s1}$ is $(n_1v_1/n_2)$ as previously noted so that the transfer function $(v_2/v_{s1})$ can easily be calculated.

The impedance of bilateral circuit 203 as seen by station 101 can be calculated from $$z_{in}=\frac{v_1}{i_1}=\frac{z_1}{\frac{v_{s1}}{v_1}-1} \quad (4)$$

Substituting Equation (3) into Equation (4), $$z_{in}=\frac{z_1}{\frac{m_2n_1}{m_1n_2}\frac{z_4}{z_3}\frac{z_1}{z_2}} \quad (5)$$

When the attenuation factors $m_1$, $m_2$, $n_1$ and $n_2$ are all unity and impedance $z_4$ is equal to impedance $z_3$, the signal voltage $v_2$ which is equal to $$\frac{v_{s1}}{1+\frac{z_1}{z_2}}$$

Under these conditions, the signal transfer system of FIG. 2 is equivalent to a direct connection between station 101 and station 102. If, however, $(n_1/n_2=m_2/m_1=k)$, *the voltage* $v_2$ equals $kv_1$ and the input impedance is $(z_2/k^2)$. This latter arrangement is equivalent to a transformer connection between station 101 and station 102. It should be noted that if $k^2$ is made equal to $z_2/z_1$, the impedance seen by station 101 at its junction with bilateral circuit 203 is its own characteristic impedance, $z_1$, so that perfect matching may be obtained.

What I claim is:

1. For use in a hybridless signal transfer system comprising a source of repetitive pulses, means for interconnecting selected stations of a plurality of stations, a bilateral circuit connected between each station and said interconnecting means comprising means for coding said repetitive pulses with a signal from said station to produce delta modulated signals and for applying said delta modulated signals to said interconnecting means, means for applying a second signal corresponding to the difference between said modulated signal and a modulated signal incoming from said interconnecting means to said connected station, said coding means comprising first means responsive to said second signal and the signal from said station for generating pulses of varying duration, second means responsive to the trailing edges of said varying duration pulses for generating fixed duration pulses, and third means responsive to said fixed duration pulses for selectively gating said repetitive pulses to said interconnecting means.

2. For use in a hybridless signal transfer system, a bilateral circuit according to claim 1 wherein said first generating means comprises a first delay flop including triggering means responsive to said repetitive pulses and means jointly responsive to said second signal and the signal from said station for varying the delay period of said first delay flop, said second generating means comprises a second delay flop responsive to the trailing edges of said first delay flop pulses for producing fixed duration pulses.

3. For use in a hybridless signal transfer system, a bilateral circuit according to claim 2 wherein said third means comprises a gate having a first input connected to said second delay flop, a second input connected to said source of repetitive pulses and an output connected to said interconnecting means, said gate being responsive to the concurrent application of said fixed duration pulses and said repetitive pulses for applying a delta modulated pulse train to said interconnecting means.

4. A signal transfer system for selectively exchanging signals between a pair of stations comprising a source of repetitive pulses, a switching network, and a hybridless bilateral circuit connected between each station and said network, each bilateral circuit including a digital delta modulation coder responsive to a first signal from said connected station and to a second signal corresponding to a demodulated delta modulated signal from said network and no output signal from said digital delta modulation coder for producing a delta modulated pulse train comprising means for linearly combining said first and second signals, means triggered by said repetitive pulses and responsive to the operation of said combining means for producing varying duration pulses, means responsive to the occurrence of the trailing edges of said varying duration pulses for producing fixed duration pulses and gating means jointly responsive to said fixed duration pulses and said repetitive pulses for delta modulating said repetitive pulses in accordance with the time of occurrence of said fixed duration pulses.